Sept. 16, 1969   J. W. ADAMS ET AL   3,467,609
PLANT GROWTH MEDIUM
Filed June 26, 1967
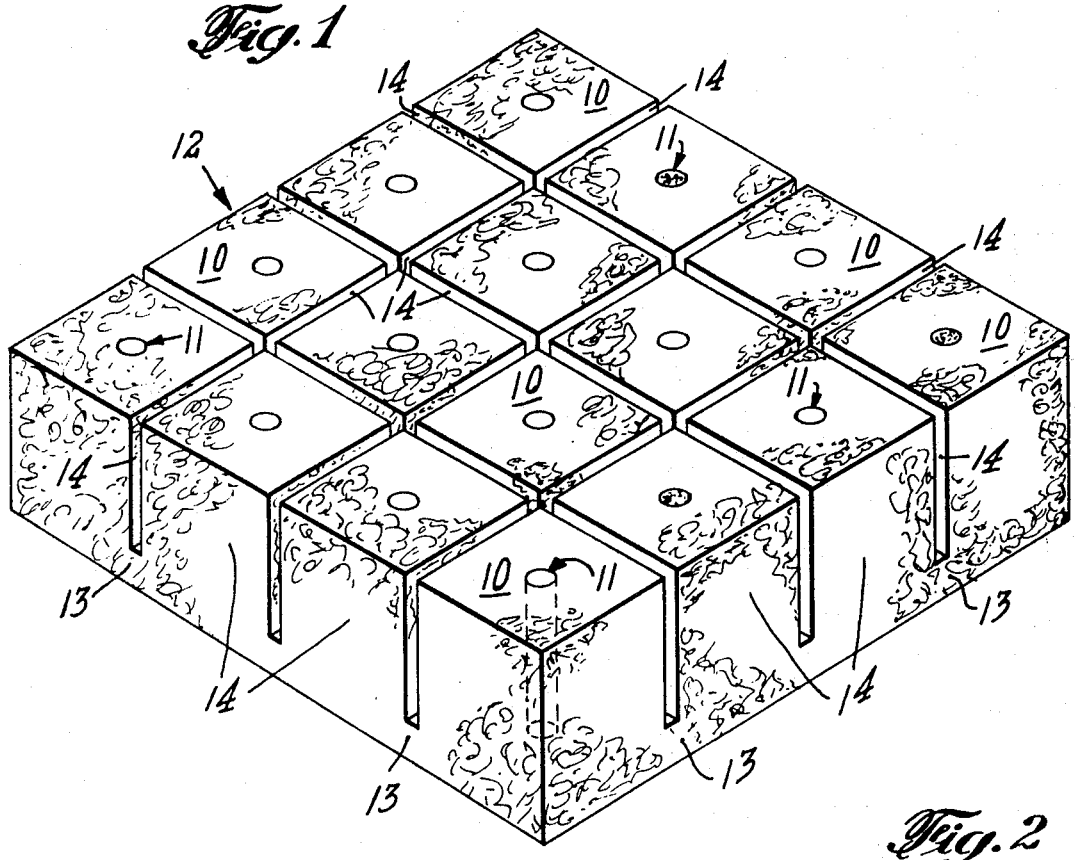
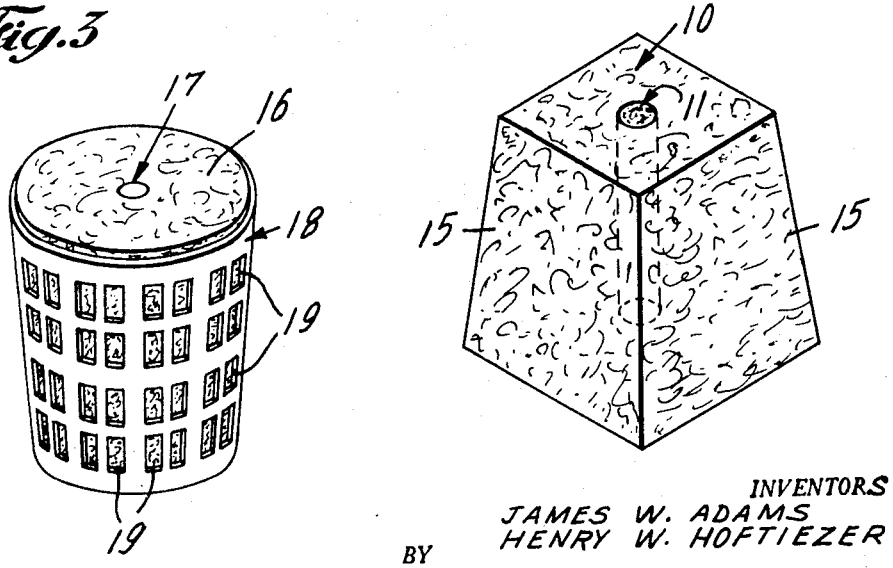
INVENTORS
JAMES W. ADAMS
HENRY W. HOFTIEZER
BY
*Frank S. Charlton*
AGENT United States Patent Office 3,467,609
Patented Sept. 16, 1969

3,467,609
PLANT GROWTH MEDIUM
James William Adams, Schofield, and Henry Wilbert Hoftiezer, Rothschild, Wis., assignors to American Can Company, New York, N.Y., a corporation of New Jersey
Continuation-in-part of application Ser. No. 572,762, Aug. 16, 1966. This application June 26, 1967, Ser. No. 651,094
Int. Cl. A01g 31/00
U.S. Cl. 260—17.4                                    7 Claims

ABSTRACT OF THE DISCLOSURE

A synthetic plant growth medium suitable for the propagation of plants from either seeds or from cuttings, which medium is prepared from cellulose fibers having an olefinically unsaturated monomer polymerized thereon.

CROSS-REFERENCE

This application is a continuation-in-part of our copending application Ser. No. 572,762 filed Aug. 16, 1966 and now abandoned.

BACKGROUND OF THE INVENTION

Traditionally, the medium in which the florist industry starts the growth of ornamental plants such as geraniums, poinsettias, chrysanthemums and the like, which are normally sold as potted plants, is a carefully compounded blend of natural soil with any of a number of materials added to improve the drainage or water-holding properties. Materials such as sand, peat, ground bark, ground peanut shells or corn cobs, vermiculite, perlite, calcium carbonate and fertilizers of various types are often used for these purposes. The composite soil is then finely ground, as in a hammer mill, and substantially sterilized in an autoclave before being used as a planting medium. The seeds or cuttings are then planted in flats or small individual pots filled with the soil blend and grown to a size suitable for transplanting in the field or in larger pots as the case may be. Commonly, the flats or pots are of a reusable type and the transplanting involves removal of the rooted plant from the small pot for transfer to the larger, with consequent injury or shock to the delicate root structure. Some expendable pots of peat or bagasse are utilized, however, in which case the entire pot is transplanted and buried in the soil of the larger pot or in the field.

SUMMARY OF THE INVENTION

In the practice of the present invention, individual cellulose fibers, obtained from wood or other suitable source by standard pulping procedures utilized in the manufacture of paper pulp, are modified by an in situ polymerization of an olefinically unsaturated monomer, preferably carried out in an aqueous slurry of the cellulose fibers. By the preferred procedure, a polyolefin is deposited and chemically bound on and within the individual fibers by the "anchored catalyst" technique first disclosed by Lipson et al., Nature, 157: 590 (1946) and Landells et al., J. Soc. Dyers and Colourists, 67: 338–344 (1951). Alternate methods for in situ polymerization of monomers to chemically bond the resulting polymer on and within fibers such as cellulose have also been taught in the art, such methods including a deposition of the monomer from the vapor phase, a slurry method in which a replacement of the water used to swell the fibers with acetone is followed by treatment with an acetone solution of monomer and catalyst, and a slurry method in which ceric ions are utilized as a catalyst for polymerization of an olefin in an aqueous medium containing cellulose pulp fibers.

The resulting polymer-modified cellulose fibers, supplemented by fiber bonding materials, plant nutrients and trace minerals, are formed into felted mats of intermeshed fibers or blocks of the desired shapes and dried to yield a medium having many advantages as a propagation and growth medium for ornamental and other plants. The growth medium is characterized by higher absorbency and water-holding power, easy penetrability by the plant root structure, sterility and resistance to decay, and attack by microorganisms such as molds, yeasts and bacteria, light weight and particularly by the very great savings in labor cost attendant on the use of this material in horticultural operations. The simplicity of use and uniformity of the product make it ideally adaptable to mechanized operations such as the field transplanting of tree seedlings grown to transplanting size in the medium of this invention.

DESCRIPTION OF THE DRAWING

FIGURE 1 is a perspective view of a multi-unit cake or mat of the planting medium separable along weakness lines into individual planting unit blocks.

FIGURE 2 is a perspective view of an individual planting block, and

FIGURE 3 is a perspective view of a planting medium block in a modified form.

DESCRIPTION OF THE PREFERRED EMBODIMENTS

Cellulose fibers obtained from wood by standard pulping procedures such as the well known sulfite or sulfate (kraft) processes are the preferred starting material for use in this invention, softwood kraft pulp being particularly advantageous because of greater fiber length than is obtained from hardwoods. Other cellulose fibers are also satisfactory, however, and cotton linters or cellulose fibers from any lignocellulosic plant such as straw may also be used.

A variety of olefinically unsaturated polymerizable materials such as acrylonitrile, styrene, acrylic acid, methyl acrylate, acrylamide, methacrylamide, vinyl acetate and the like, alone or in combination with one another, may be successfully polymerized in and on cellulose fibers by the anchored catalyst technique for use in the present invention. Although the above mentioned characterizing properties of the plant growth medium of the present invention are obtained, at least to some extent, by an in situ polymerization of any of the above materials in and on the fibers, acrylonitrile has been found to be outstanding in optimizing if not maximizing these properties and is therefore greatly to be preferred over other known polymer-forming materials for chemically bonding to cellulose fibers in the preparation of the plant growth medium of the present invention. Mixtures of acrylonitrile with small amounts, e.g. up to about 10% by weight, of one or another of the monomers listed above may also be considered satisfactory for this use. Polymer modified fibers resulting from such a mixture are not materially different in end-use properties from those fibers resulting from the use of 100% acrylonitrile. In the following discussion and claims, the term acrylonitrile is intended to include mixtures of this material with such minor amounts of other monomers capable of co-polymerization therewith.

The following example is representative of the method by which the polymer-modified cellulose fibers are prepared, the proportions in this and subsequent examples being in terms of weight units.

Example 1

One-hundred parts of cellulose pulp fibers are slurried in 2700 parts of de-ionized water, the pH is adjusted to 3.5 by the addition of about 0.18 part of sulfuric acid and 220 parts of fresh acrylonitrile are then added. The blend is heated to reflux for 10 minutes to expel air and 0.30 part of ferrous ammonium sulfate hexahydrate and 3.6 parts of 25% hydrogen peroxide are added to succession. The blend is then heated at reflux for about 45 minutes and the unreacted acrylonitrile is then allowed to distill off and is recovered for use in subsequent cycles. The polymer-modified fibers may be screened from the reaction mixture and dried to yield about 250 parts of dry material, or may be retained as a wet pulp for formation directly into the plant growing medium by subsequent operations to be detailed hereinafter.

The amount of polymer deposited in and on the cellulose fibers may be varied within wide limits by varying the proportions of the reactants in Example 1. For use as a plant growth medium it is preferred that between 50 parts and about 500 parts or more of polymer be formed on each 100 parts of cellulose fibers. A polymer-to-fiber ratio of between 1 to 1 and 3 to 1 is particularly satisfactory. If the polymer-treated pulp has a polymer-to-fiber ratio of less than 0.5 to 1, the resulting plant growth medium is more susceptible to microbiological degradation than is desirable, whereas polymer-to-fiber ratios substantially in excess of 5 to 1 are economically less attractive.

The polymer-treated cellulose fiber material may be formed, preferably, but not necessarily, together with suitable binders, nutrients, buffering materials and modifiers, into various shapes suitable for use as plant growth media. For example, individual planting blocks 10 of about 1½ in. by 1½ in. by 2 in., as shown in FIGURE 2 having a ¼–⅜ in. diameter cylindrical or tapered hole or cavity 11 of approximately 1 inch in depth formed therein have proven to be very satisfactory for the rooting of cuttings of a wide variety of plants. By standard pulp molding or slush pulp molding techniques, such blocks may be molded individually, as shown in FIGURE 2, from dilute (1–3%) water slurries or in multi-unit cakes 12, as shown in FIGURE 1, joined together by a readily severable section 13 of minimal thickness to enable the multi-unit cake to be handled in one piece for starting plant growth and during the growing period and then severed into the individual plant units for repotting or field transplant operations. In either case, the blocks may be molded with substantially vertical sides 14, as shown in FIGURE 1 or in the form of truncated pyramids as illustrated by the individual block with tapered sides 15, shown in FIGURE 2. The polymer-modified fibers may also be formed into large sheets or felted fibrous mats on a modified paper-making machine of cylinder or Fourdrinier type such as those commonly utilized in the manufacture of fiberboard, the large sheets being subsequently cut and drilled into individual planting blocks 10 or multi-unit cakes 12 of convenient size similar to those obtained by pulp molding techniques.

Felted mats of the polymer-modified fibers may also be produced by air-forming techniques in which the dried fibers are blown, together with a minor amount of a finely divided thermoplastic binder, onto a moving screen or belt and thereby formed into a mat. Interfiber bonding is accomplished by heating the intermeshed mat of fibers sufficiently to activate the thermoplastic bonding agent.

In each of the above procedures, the individual fibers become intermeshed and entangled with one another in a "brush pile" configuration of low solid density and having a porous, spongy nature.

Pulp molding processes also lend themselves to the preparation of planting blocks of intertwined and intermeshed fibers in a variety of shapes, including truncated cones or pyramids, cylinders or other shapes which may have special adaptability to a given situation. Blocks may also be molded to fit within the standard clay pots or in special shaped vessels in which plants are merchandised to the consumer. Planting units of regular shape such as cylinders or substantially cubical blocks have the particular advantage of ready adaptability to mechanized transplanting operations wherein the seedling-bearing blocks are individually fed from a magazine at spaced intervals to a planting mechanism. If desired for mechanized planting, the medium may be molded within a perforated or readily rupturable container of an expendable nature, and the entire unit, including the container, may be transplanted mechanically.

Such a planting unit is illustrated in FIGURE 3, wherein the fibrous planting medium 16 including a hole or cavity 17 in its upper surface is molded within a container 18 having a series of apertures 19 therein serving the double purpose of allowing drainage of the aqueous slurry medium away from the fibrous solids during the molding of the unit and also allowing easy penetration of both water and the plant root structure during use of the unit. Suitably, the container 17 may be formed of an inexpensive polymer such as polystyrene, and the apertures 18 may be of any suitable size, number and location for the purposes stated.

A fiber-bonding material is generally of value in forming the polymer-modified cellulose fibers into a suitable plant growth medium. The amount of binder used is preferably kept to a minimum, since most materials which exhibit satisfactory fiber bonding properties are subject to biological degradation by various microorganisms. Some polymeric resinous materials are satisfactory if the amount used is restricted to a level at which microbiological degradation is not overly objectionable. Certain inorganic binders such as sodium silicate have also shown utility in the present application. Between about 0.5% and about 5% of a fiber bonding material such as polyvinyl alcohol, carboxymethyl cellulose, polyacrylic acid salts or polymetharcylic acid salts may be utilized satisfactorily. Binding materials such as starch and animal glue are usually undesirable since their high susceptibility to microbiological attack rapidly creates a nitrogen demand which robs the medium of nutrient materials necessary for growth of the plant.

A particularly efficacious binding material is one which is fibrous in nature and is therefore completely retained with the polymer-modified cellulose fibers when water is removed therefrom in the molding process. Water soluble binders incorporated in the aqueous slurry of fibers are, of course, partially wasted by loss in the aqueous medium when the fibers are separated therefrom, and are therefore preferably applied by spraying over the already-formed blocks. The preferred binder, which is completely fibrous in nature and water-insoluble, is prepared by treating the polyacrylonitrile modified fibers of Example 1, above, with aqueous caustic soda at an elevated temperature, whereby the polyacrylonitrile is at least partially hydrolyzed to polyacrylic acid salts. If desired, suitable trace elements helpful to plant growth may be added to the resulting gelatinous fibrous binder suspension. The preparation of this binder is described in the following example.

Example 2.—Preparation of the fibrous binder

Twenty-five parts of polyacrylonitrile-modified cellulose fibers prepared according to Example 1 are slurried in 540 parts of water, 12.5 parts of sodium hydroxide are added and the mixture heated at 90–98° C. for 1 hour. The pH is adjusted to 8.0 by the addition of 10–11 parts of sulfuric acid in about a 25% water solution. If desired, at this time, a solution of the following salts of trace elements in 250 parts of water may be added as plant nutrients:

| | Parts |
|---|---|
| Magnesium sulfate heptahydrate | 4.9 |
| Ferric chloride | 1.7 |
| Manganese sulfate | 0.58 |
| Zinc chloride | 0.044 |
| Cupric chloride dihydrate | 0.022 |

The resulting suspension of about 3% by weight of gelatinous polymer-impregnated fibers serves as an excellent binder for the polymer-modified cellulose fibers in forming the plant growth medium of this invention, due particularly to its adhesive properties and its water insolubility.

Polymer-modified cellulose fibers prepared in accordance with Example 1, above, may be formed into a medium suitable for the rooting of plant cuttings by the procedure of the following Example 3.

Example 3.—Preparation of the plant growth medium in the form of multi-unit cakes One-hundred parts of polymer-modified cellulose fibers prepared according to Example 1, together with 5 parts of powdered limestone as a buffering agent are slurried in sufficient water to make approximately a 1% solids suspension. One-hundred parts of a fibrous binder suspension prepared according to Example 2, above, and containing about 3 parts (solids basis) of fibrous binder are introduced into the polymer-modified fibrous slurry and the slurry thoroughly beaten in a pulp refiner or hydrapulper. The resulting well-dispersed fiber slurry is then formed into multi-unit cakes in a pulp molder with a multiple cavity mold. A suitable mold is one having 64 cavities, which forms a 64 unit cake wherein each unit is about 1½ in. by 1½ in. by 2 in., joined at the bases of the units to the adjacent units in the cake by the bottom ¼–⅜ in. of molded fibrous mat. A cavity about ¼–⅜ in. in diameter and about 1 inch deep is formed in the top of each unit during the molding process. If desired, each block may be sprayed, preferably in its moist condition, with a plant nutrient solution such as 5–10–6 fertilizer solution, after which the cakes are dried in an oven.

A suitable nutrient solution for applying to the blocks contains 192 parts of $KH_2PO_4$, 105 parts of $NH_4NO_3$ and 62 parts of $(NH_4)_2SO_4$. For balanced nutrition, 5 parts of $H_3BO_3$ and 0.005 part $Na_2MoO_4 \cdot 2H_2O$ may also be added and the whole dissolved in 1,000 parts of water. About 4 parts of the above solution sprayed on 100 parts (dry basis) of the molded blocks is sufficient to provide nutrient for a growing plant or cutting for about three to four weeks.

The planting medium blocks prepared as described above are extremely light in weight and very porous, having a bulk density of between about 0.05 and 0.15 gm. per cc. Blocks having a bulk density between about 0.05 and 0.075 gm. per cc. or about 3 to 5 lbs. per cubic foot are preferred. The low density and high porosity of this planting medium are instrumental in allowing rapid penetration of the medium by the root structure of the plant, which facilitates oxygenation of the root system and a very rapid "take" when the plant is repotted or field planted. The plant growth medium of this invention is unique in its high water holding power, each block being capable of absorbing and retaining up to at least 10 times its own weight in water, with resultant decrease in the frequency at which re-watering of the plant is required. The medium is a sterile one and neither rots, molds nor supports the growth of microorganisms which are deleterious to plant growth.

In use as a medium for the propagation of stem or leaf cuttings of ornamental plants or in the growth of flower or vegetable plants from seed, the desired cuttings or seeds are embedded in the cavity formed in the top surface of the planting unit block and the block is thoroughly watered either from the bottom or by intermittent spray, both methods being common in the industry. Planting may be carried out in individual unit blocks or a multi-unit cake of convenient size may be treated as a unit. When the plants have reached the repotting stage at which the roots have completely penetrated the structure of the planting blocks, the multi-unit cakes are separated into individual unit blocks, each containing and supporting its own growing plant, are either repotted by burying the block in potting soil or by transplating into the field.

Extensive testing of the planting medium of the present invention in comparison with a number of excellent potting soil media has clearly demonstrated the superiority of the medium of this invention in rapidity of growth of a variety or ornamental plants, rapidity of root development and root penetration through the potting medium, rapidity of recovery or "take" of the plant on repotting, complete freedom from pathogens, weeds or deleterious insects, rapid penetration of water into the medium and length of time before re-watering is necessary. The ease of handling and adaptability of the regularly shaped blocks to both hand plantings and mechanized transplantings result in substantial reductions in labor costs. Plants rooted in this medium are easily packaged and shipped without crumbling of the medium or damage to the plants. Shipping weight is sharply reduced because of the lightness of the planting medium.

While particular embodiments of this invention have been described herein, modifications thereof will suggest themselves to those skilled in the art and the invention is intended to be limited in scope only by the language of the appended claims.

We claim:

1. A plant growth medium in the form of a felted mat of predetermined shape and dimensions comprising fibers consisting essentially of natural cellulose having chemically bonded therein and thereon by in situ polymerization between about 50 and 500 parts by weight of a polymer of an olefinically unsaturated monomer for each 100 parts of said cellulose fibers.

2. A plant growth medium according to claim 1 wherein said fibers are randomly bonded together by a bonding agent present in said medium in an amount between 0.5% and 5.0% of the solids weight thereof.

3. A plant growth medium according to claim 2 wherein said bonding agent is comprised of fibers which are insoluble in an aqueous medium.

4. A plant growth medium according to claim 2 wherein said bonding agent comprises natural cellulose fibers having chemically bonded therein and thereon metal salts of polyacrylic acid formed by in situ polymerization of acrylonitrile followed by hydrolysis thereof in an alkaline medium.

5. A plant growth medium in the form of a block of felted material having a bulk density between about 0.05 and 0.15 gm. per cc. comprising a microbiologically stable substance consisting essentially of natural cellulose fibers having polyacrylonitrile chemically bonded thereon and therein by in situ polymerization in a polymer-to-fiber weight ratio between 0.5 to 1 and 5.0 to 1, said block having in its upper surface a cavity suitably dimensioned to receive a seed or cutting of a plant to be rooted in said medium.

6. The plant growth medium according to claim 1 wherein said monomer is acrylonitrile.

7. The plant growth medium according to claim 1 wherein said felted mat comprises a plurality of blocks free of and spaced from each other at one end and joined to each other at their opposite end.

References Cited

UNITED STATES PATENTS

| | | | |
|---|---|---|---|
| 2,358,000 | 9/1944 | Cornell | 31—58 |
| 2,785,969 | 11/1953 | Clawson | 71—64 |
| 2,923,093 | 2/1960 | Allen | 47—56 |
| 2,971,290 | 2/1961 | Kyle | 47—1.2 |
| 3,083,118 | 3/1963 | Bridgeford | 117—47 |
| 3,112,577 | 12/1963 | Bürger | 47—37 |
| 3,172,234 | 3/1965 | Eavis | 47—1.2 |
| 3,194,727 | 7/1965 | Adams et al. | 162—168 |
| 3,370,935 | 2/1968 | Adams et al. | 71—29 |

WILLIAM H. SHORT, Primary Examiner

E. NIELSEN, Assistant Examiner

U.S. Cl. X.R.

8—116.2; 47—1.2; 71—64